United States Patent [19]

Hane

[11] Patent Number: 4,791,533
[45] Date of Patent: Dec. 13, 1988

[54] NATURAL LIGHTING APPARATUS

[75] Inventor: Tadashi Hane, Tokyo, Japan

[73] Assignee: Shimizu Construction Co., Ltd., Tokyo, Japan

[21] Appl. No.: 65,841

[22] Filed: Jun. 24, 1987

[30] Foreign Application Priority Data

Jun. 24, 1986 [JP] Japan .................. 61-147693
Jul. 29, 1986 [JP] Japan .................. 61-116591[U]

[51] Int. Cl.$^4$ .................................. F21V 7/00
[52] U.S. Cl. .................................. 362/1; 126/425; 250/203 R; 350/264; 350/637; 353/3
[58] Field of Search ............... 350/258, 264, 636, 637; 362/1; 250/203 R, 203 S; 353/3; 126/424, 425, 439, 451

[56] References Cited

U.S. PATENT DOCUMENTS

| | | | |
|---|---|---|---|
| 1,632,254 | 6/1927 | Vinogradov | 353/3 |
| 2,494,879 | 1/1950 | Journel et al. | 353/3 |
| 4,086,485 | 4/1978 | Kaplow et al. | 126/425 |
| 4,179,612 | 12/1979 | Smith | 250/203 S |
| 4,225,781 | 9/1980 | Hammons | 250/203 S |
| 4,349,245 | 9/1982 | Kliman | 126/425 |
| 4,419,981 | 12/1983 | Mori | 250/203 S |

FOREIGN PATENT DOCUMENTS

| | | | |
|---|---|---|---|
| 982906 | 2/1951 | France | 126/425 |
| 4014 | 1/1982 | Japan | 126/424 |
| 1019185 | 5/1983 | U.S.S.R. | 353/3 |

Primary Examiner—Samuel Scott
Assistant Examiner—Noah Kamen
Attorney, Agent, or Firm—Scully, Scott, Murphy & Presser

[57] ABSTRACT

A natural lighting apparatus includes a mirror for reflecting light, and a supporting mechanism for supporting the mirror for rotation about both a first axis and a second axis perpendicular to the first axis. A first sensing mechanism is provided for sensing a first direction of the light source about the first axis, and for generating a first signal representative of the first light source direction about the first axis. A second sensing mechanism is provided for sensing a second direction of the light source about the second axis, and for generating a second signal representative of the second light source direction about the second axis. An attitude control mechanism angularly drives the mirror about the first axis according to the first signal from the first sensing mechanism, and about the second axis according to the second signal from the second sensing mechanism, thus controlling the attitude of the mirror to reflect light from the light source in a predetermined direction.

6 Claims, 9 Drawing Sheets

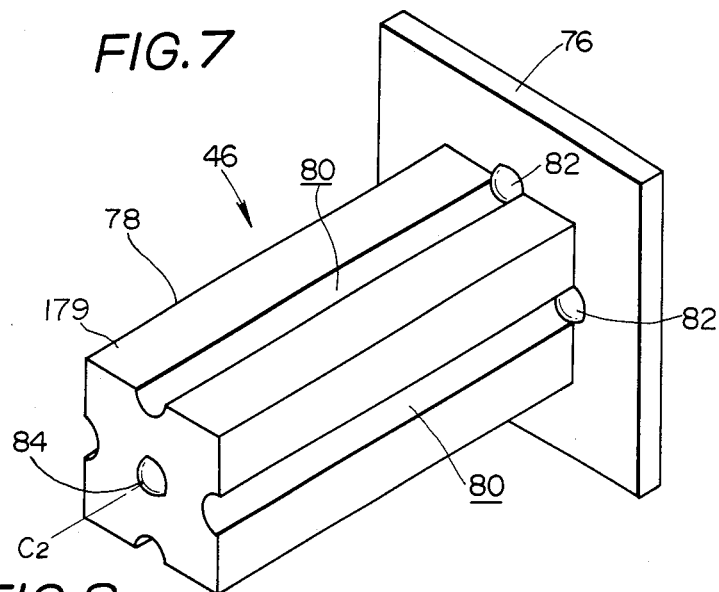
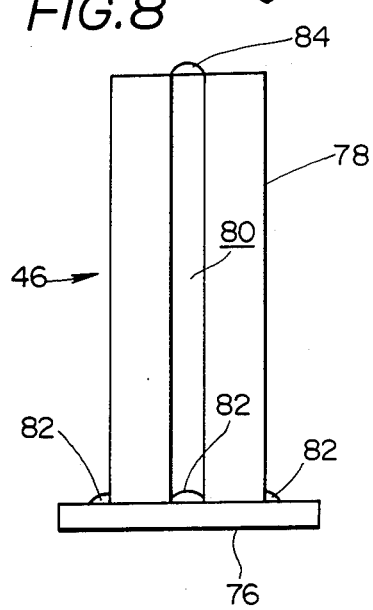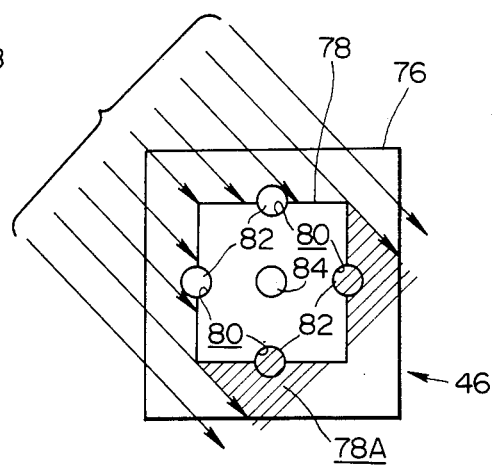

NATURAL LIGHTING APPARATUS

BACKGROUND OF THE INVENTION

The present invention relates generally to natural lighting apparatus which introduces natural light, such as sunlight, in a desired direction therein.

Natural lighting apparatus is conventionally used for lighting with sunlight the shady portions of a building, street, etc. Such conventional natural lighting apparatus is often controlled by a computer system to follow the sun for enhancing its lighting efficiency. For this control, the locus of the sun is calculated according to information on the location, such as latitude, etc. of the installation site. This prior art lighting apparatus is disadvantageous in that it must be adjusted with a relatively high degree of accuracy according to the latitude and the like of the location of the installation site, and the computer program must also be changed. These disadvantages result in a considerable increase in the installation costs thereof.

SUMMARY OF THE INVENTION

Accordingly, it is an object of the present invention to provide a natural lighting apparatus which requires no substantial adjustment, such as a latitude adjustment, for differences in the location of the installation site, thus reducing the installation costs thereof.

The present invention provides a natural lighting apparatus which includes a mirror having a mirror face for reflecting the natural light. A supporting mechanism supports the mirror to be rotatable about both a first axis and a second axis perpendicular to the first axis. A first sensing mechanism senses a first direction of the natural light source about the first axis, and generates a first signal representative of the first light source direction about the first axis. A second sensing mechanism is provided for sensing a second direction of the light source about the second axis, and generates a second signal representative of the direction of the natural light source about the second axis. An attitude control mechanism is provided for angularly moving the mirror about the first axis in accordance with the first signal from the first sensing mechanism, and about the second axis according to the second signal from the second sensing mechanism, thus controlling the attitude of the mirror to reflect light from the light source in a predetermined direction.

BRIEF DESCRIPTION OF THE DRAWINGS

The present invention is now described with reference to the accompanying drawings, in which like reference numerals designate similar parts throughout the figures and in which:

FIG. 7 is a perspective view of an enlarged fine control sensor in FIG. 2;

FIG. 8 is a side elevational view, with a reduced scale, of the fine control sensor in FIG. 7;

FIG. 9 is a front elevational view of the fine control sensor in FIG. 8;

DETAILED DESCRIPTION OF THE DRAWINGS

Figure 1:
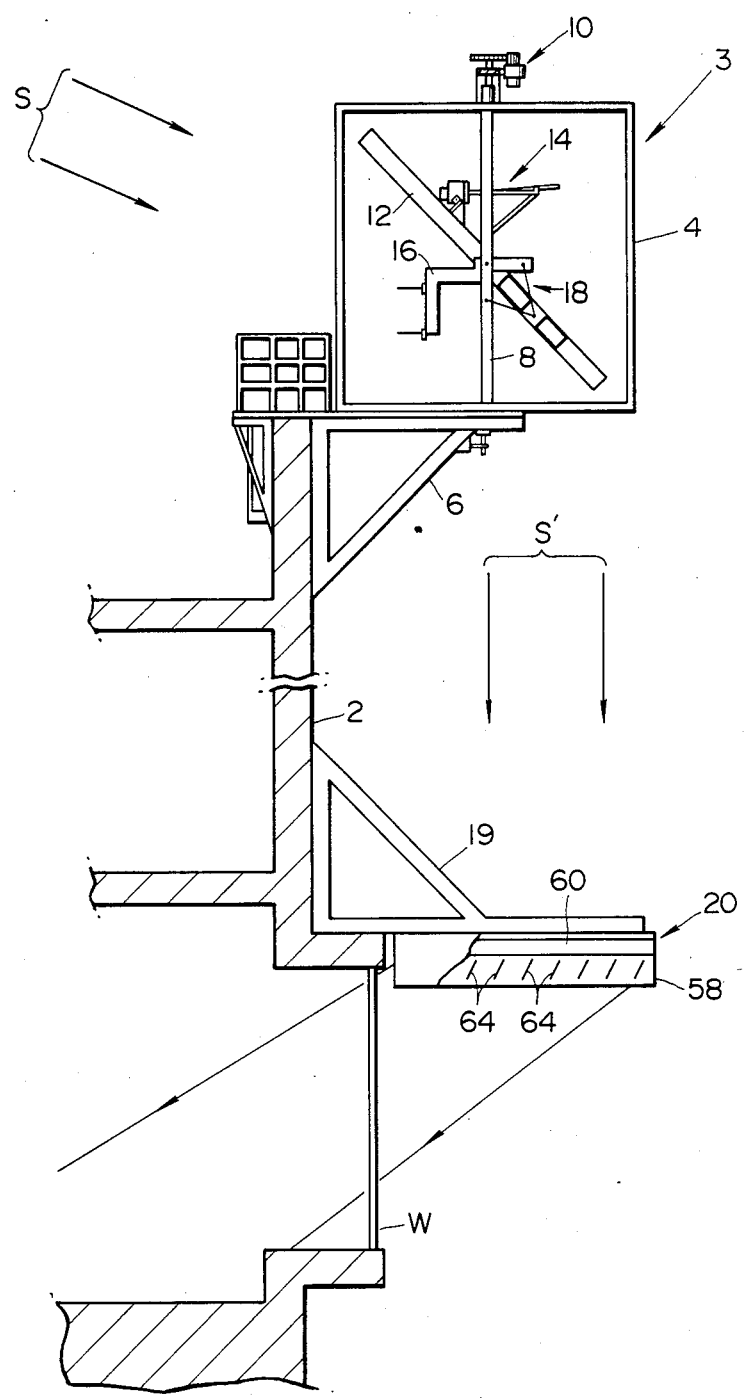
FIG. 1 is a side elevational view, partially in section, of a natural lighting apparatus according to the present invention.

Referring to FIGS. 1 to 9, a natural lighting apparatus constructed pursuant to the teachings of the present invention includes a light introducing unit 3 for introducing sunrays S vertically downwardly and a light reflecting unit 20 for reflecting sunrays S' in a predetermined direction therein.

The light introducing unit 3 has a cubic outer frame 4 mounted to a side wall 2 of a building with a supporting frame 6. Each of the five faces of the outer frame 4 except the bottom face is covered with a transparent cover 56 made of acrylic resin, although the covers 56 are not shown in FIG. 1. A rectilinear inner frame 8 is mounted within and through the outer frame 4. The inner frame 8 is supported on the outer frame 4 for rotation about a vertical axis Z with its central axis placed along the vertical axis Z. Upper and lower frame members of the inner frame 8 have an upper journal 21 and lower journal 22 respectively. The upper journal 21 passes rotatably through an arcuate supporting member 24, of which opposite ends are attached to the outer frame 4, while the lower journal 22 is rotatably supported on a thrust bearing 26 which is mounted to the supporting frame 6. The upper journal 21 has a spur gear 27 mounted at its top. The spur gear 27 meshes with a pinion 28 which is mounted on an output shaft of a driving unit 30 which includes an electric motor, and is fixed to the arcuate supporting member 24. The spur gear 27, pinion 28 and the drive unit 30 constitute a frame rotating mechanism 10. The spur gear 27 has a coarse control sensor 44 mounted on its top face. The arcuate supporting member 24 has a limit switch 45 for limiting the horizontal rotational range of the frame 8. The limit switch 45 is actuated by actuating rods (not shown) mounted to the spur gear 27. The inner frame 8 has a rectilinear plane mirror 12 mounted by pins 42 and 42 to its side frame members 8B and 8B, only one of which is shown, for rotation about a horizontal axis. The mirror 12 is placed between the side frame members 8B and 8B with its mirror face 32 facing a forward or front direction. The mirror 12 is provided with a mirror rotating mechanism 14 which includes a drive unit 34 which includes an electric motor, and is pivotably connected through a bracket 36 to the back of the mirror 12 for angular movement about a horizontal axis. The output shaft of the drive unit 34 is coaxially joined to a screw rod 38 which is threaded to a horizontal strip member 41, the opposite ends of which are mounted to the inner frame 8 through both horizontal stays 40 and inclined stays 43. By actuating the motor of the drive unit 34, the mirror 12 is angularly moved about the pins 42. One side frame member 8B of the inner frame 8 is provided with a first limit switch 145 for limiting the lower limit of the dip angle $\theta$ of the mirror 12, and a second limit switch 47 for limiting the upper limit of the dip angle $\theta$ of the mirror 12. The limit switches 145 and 47 are actuated when the rear face 33 of the mirror 12 impinges thereon.

The inner frame 8 has a pair of generally L-shaped sun following levels 16 and 16, only one of which is shown. Each of the sun following levers 16 and 16 is pivotally attached to a corresponding side frame member 8B by the pin 42 located between the mirror 12 and the side frame member 8B. Each sun following lever 16 has a fine control sensor 46 at the free end of one arm 16A nearer to the mirror face 32. The other arm 16B of each sun following lever 16 is connected to a corresponding side edge 13 of the mirror 12 through a slider crank mechanism 18, which includes a slider 50. Each slider 50 has a dovetail tenon 54 formed in the corresponding side edge 13 to extend therealong. Two link members 48 and 52, equal in length, are pivotally connected at their one ends to a corresponding slider 50. The other ends of the link members 48 and 52 are pivotally connected to the other arm 16B of a corresponding sun following lever 16 through a pin 49, and to a corresponding side frame member 8B through a pin 53, respectively. Thus, the dip angle $\theta$ is maintained to half of an angle contained between the one arm 16A and the side frame members 8b about the horizontal axis.

Figure 3:
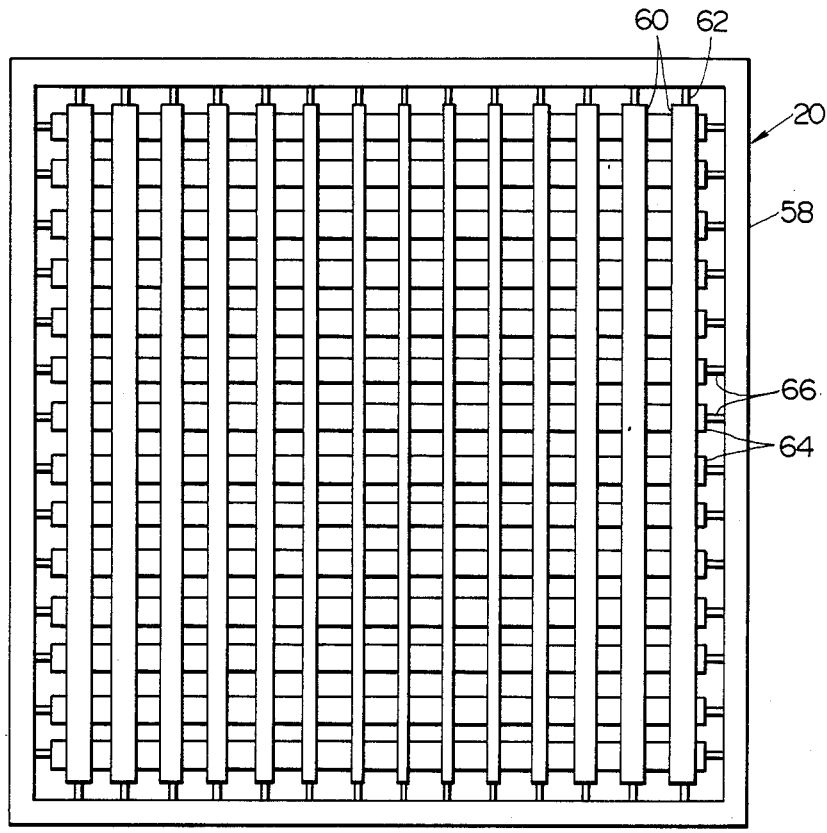
FIG. 3 is an enlarged plan view of the light reflecting unit in FIG. 1.
Figure 4:
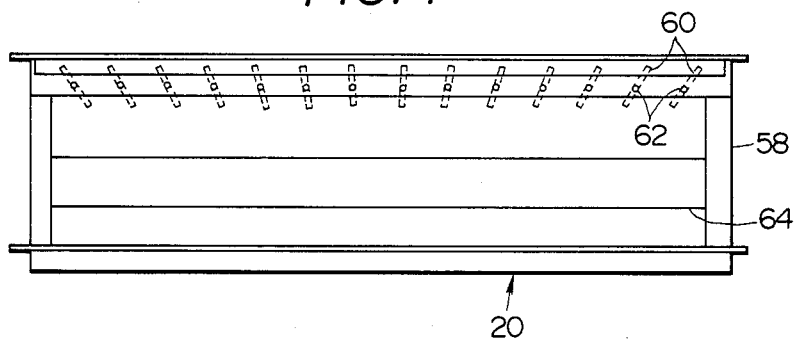
FIG. 4 is a first side view of the light reflecting unit in FIG. 3.
Figure 5:
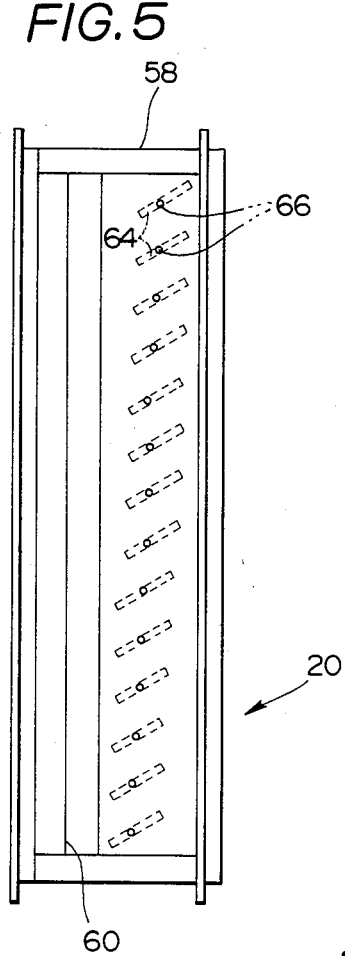
FIG. 5 is a second side view of the light reflecting unit in FIG. 3.

The reflecting unit 20 is more clearly shown in FIGS. 3-5, and includes a rectilinear tubular frame 58. A multiplicity of upper parallel plane mirror strips 60 are rotatably supported to the inside of the frame 58 to form an upper louver. Furthermore, the frame 58 has a multiplicity of lower parallel plane mirror strips 64 rotatably mounted to the inside thereof at a lower level than the upper plane mirror strips 60. The lower plane mirror strips 64 are perpendicular to the upper plane mirror strips 60, thus forming a grid therewith when viewed in a plan view. The upper and lower plane mirror strips 60 and 64 are mounted to the frame 58 respectively through journals 62, 62 and 66, 66. In this embodiment, the angles of plane mirror strips 60 and 64 to the horizontal plane are individually controlled by angular movements thereof. However, they may be simultaneously adjusted by providing a sprocket to, for example, one journal 62 of each of the upper plane mirror strips 60, and by connecting the sprockets with a chain.

Figure 6:
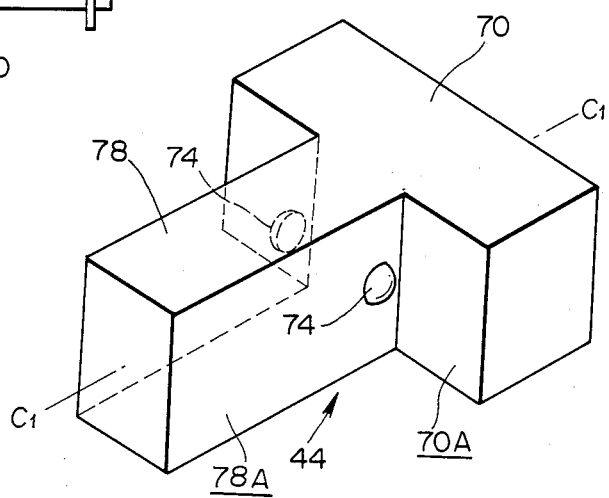
FIG. 6 is a perspective view of an enlarged coarse control sensor in FIG. 2.

As illustrated in FIG. 6, the coarse control sensor 44 has a generally T-shape and includes a rectangular parallelepiped base portion 70 and a rectangular parallelepiped body portion 78 extending perpendicularly from the base portion 70. The body portion 78 has a pair of photosensors 74, 74 attached to its opposite side walls 78A and 78A at positions near the base portion 70 and symmetrical about the center line C1 of the body portion 78. The photosensors 74 are so disposed that the electrical signals generated thereby are equal in amplitude when the central axis C1 of the body portion 78 is directed toward the sun. When the central axis C1 crosses the direction of the sunrays S, the shadow of the body portion 78 falls on one of the photosensors 74, thus causing a difference in the sunrays received by the two photosensors 74. The coarse control sensor 44 is mounted on the gear 27 so that the central axis C1 of the body portion 78 is directed perpendicular to and forwardly from the mirror face 32 of the mirror 12.

Each of the fine control sensors 46 includes a square base plate 76 and a body portion 78 attached at one end to the base plate 76 at a right angle thereto. The body portion 78 has a generally square tubular shape, and has a longitudinal groove 80 formed in each side face 179 thereof along its length, with the groove 80 having a semicircular cross-section. Each of the longitudinal grooves 80 is formed to extend at the center of the corresponding side face 179 of the body portion 78 so that the grooves 80 are symmetrical about the central axis C2 of the body portion 178. Four photosensors 82, which are the same diameter as the grooves 80, are attached to the base plate 76 so that one half of each fits into a corresponding groove 80 as illustrated in FIG. 7. Thus, the photosensors 82 are disposed at regular angular intervals of 90° about the central axis C2. The central axis of the light receiving face of each photosensor 82 is directed toward the top of the body portion 78 and in parallel with the center axis C2. With such a construction, shadows 78A of the body portion 78 as illustrated in FIG. 9 falls on at least one of the photosensors 82 when the center axis C2 of the body portion 78 crosses the direction of sunrays S. Another photosensor 84 is attached to the top end of the body portion 78 with its light receiving face placed concentric with the body portion. This photosensor 84 may be omitted. The base plate 76 of each of the two fine control sensors 46 and 46 is mounted to the distal end of the one arm 16A of the corresponding sun following lever 16 so that its center axis C2 is directed forwards in parallel with the longitudinal axis of the one arm 16A as illustrated in FIG. 2.

Figure 2:
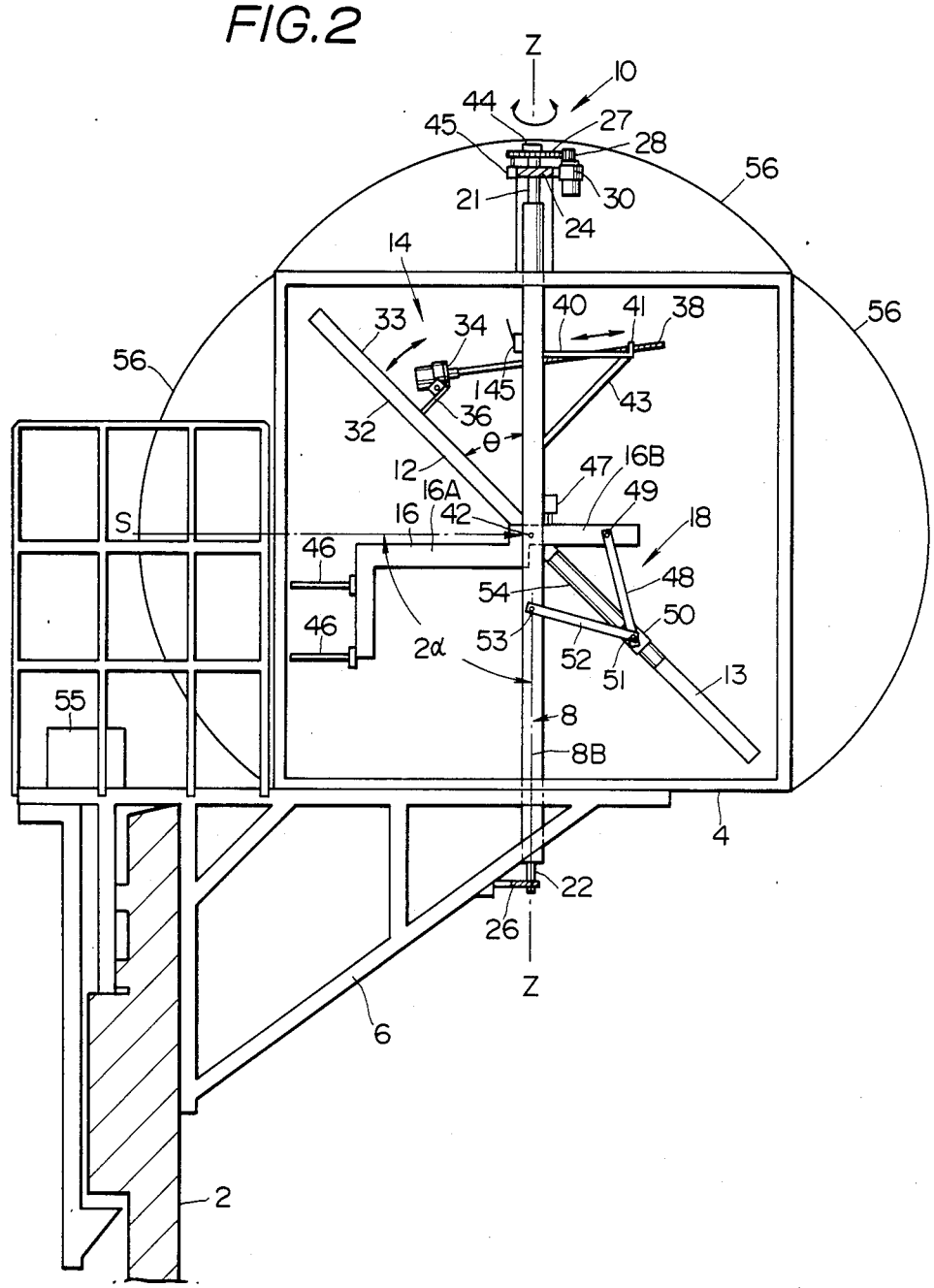
FIG. 2 is an enlarged side elevational view of the light introducing unit in FIG. 1.

The photosensors 74, 74, 82, 82, 82 and 84, and limit switches 45, 47 and 145 are electrically connected to a conventional electric control unit 55 (FIG. 2). The drive units 30 and 34 are electrically connected to a power source (not shown) through the control unit 55.

When the center axis C1 of the coarse sensor 44 crosses the direction of sunrays S, this causes a difference in the quantity of sunrays received by the photosensors 74 and 74. Electrical signals representing the quantity of received sunrays are supplied by the photosensors 74 and 74 to the control unit 55 where comparison is made between the received light quantities of the photosensors 74 and 74 to generate a drive signal which drives the driving unit 30 for turning the inner frame 8 about the vertical axis Z to minimize the difference in received light quantities of the photosensors 74 and 74, so that the center axis C1 of the coarse sensor 44 is brought generally in parallel with the direction of sunrays S in a horizontal plane. Thus, the mirror face 32 is directed toward the sun with an initial dip angle $\theta$. This coarse control operation is completed when the difference in received light quantities of the photosensors 74 and 74 drops to a predetermined level.

In the fine control sensors 46, electrical signals representative of the received light quantity are supplied by the photosensors 82 and 82 to the control unit 55 where a comparison between the received light quantities of the photosensors 82 and 82 is also made to generate a drive signal which drives the driving unit 34, so that the screw rod 38 is rotated for turning the mirror 12 about the pins 42 or the horizontal axis. Thus, the sun following levers 16 and 16 are rotated about pins 42 and 42 through slider crank mechanisms 18 to minimize the difference in received light quantities of the photosensors 82 and 82, so that the center axis C2 of each fine sensor 46 is directed to the sunrays S as illustrated in FIG. 2. In this event, the dip angle θ is automatically set to (90°−α) with the slider crank mechanisms 18, where the angle is one half of the angle formed between each arm 16A and the inner frame 8 about the horizontal axis. Thus, the sunrays S are reflected by the mirror face 32 downwardly along the vertical axis Z. The control unit 55 may supply a drive signal, according to the output signals from photosensors 82 and 82, horizontally disposed to the drive unit 30, so that a fine control of rotation of the inner frame 8 is made. In this manner, the natural lighting apparatus follows the sun so that it reflects light downwardly.

The mirror 12 is kept stationary at night or on a cloudy day since output signals from the photosensors in each of the sensors 44, 46 balance.

The limit switch 45 is actuated by the actuating rods of the spur gear 27 to provide inner frame limit position signals to the control unit 55, which then stops and reverses the motor of the drive unit 30. Thus, the mounting positions of the actuating rods define the range of the rotation angle of the inner frame 8. When the mirror 12 is rotated to a substantially vertical position, it actuates the lower limit dip angle limit switch 145, which provides a lower limit dip angle signal to the control unit 55, which then reverses the motor of the drive unit 34. When the upper dip angle limit switch 47 is actuated by the mirror, which is placed substantially horizontal, it provides an upper limit dip angle signal to the control unit 55, which according to this signal reverses the motor of the drive unit 34. Thus, the range of the dip angle θ is determined by the limit switches 47 and 145.

Figure 10:
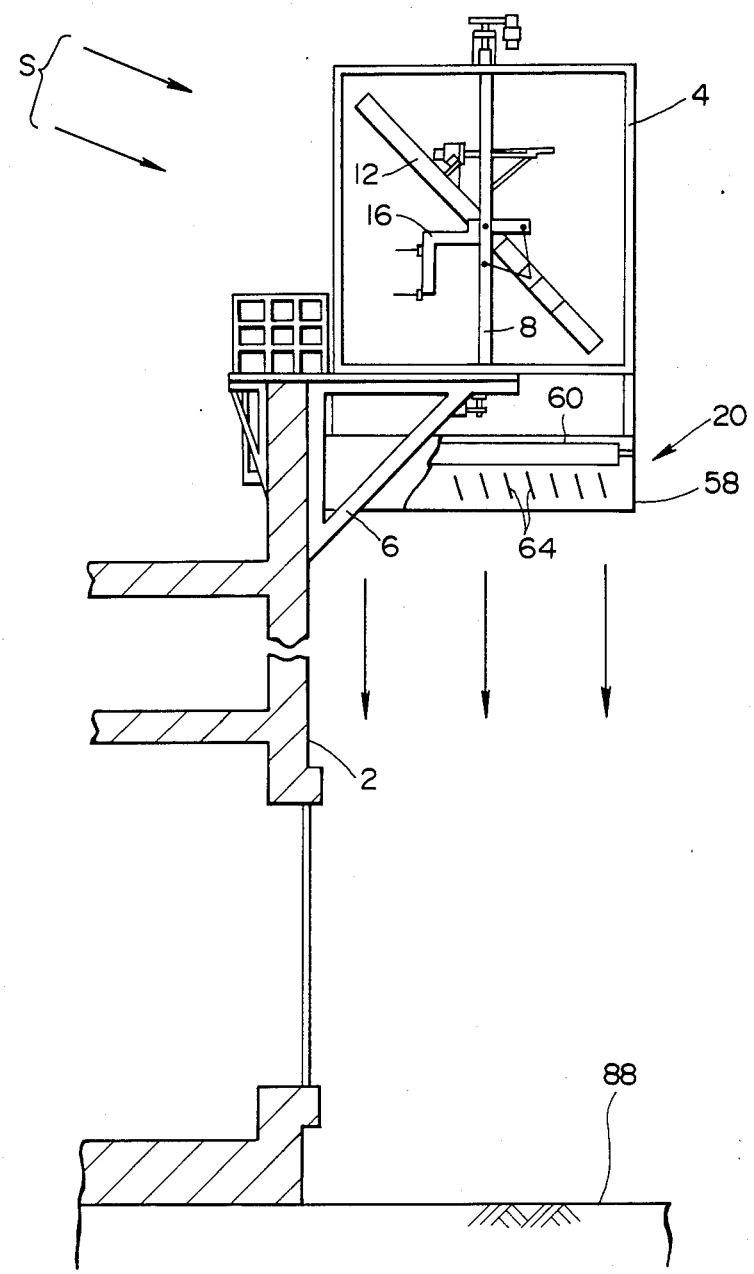
FIG. 10 is a side elevational view of a modified embodiment of the natural lighting apparatus of FIG. 1.

A modified form of the natural lighting apparatus in FIG. 1 is illustrated in FIG. 10, in which the reflecting unit 20 is supported by the supporting frame 6 to be located just below the light introducing unit 3. This lighting apparatus is used for lighting a shady place 88 of a building.

Figure 11:
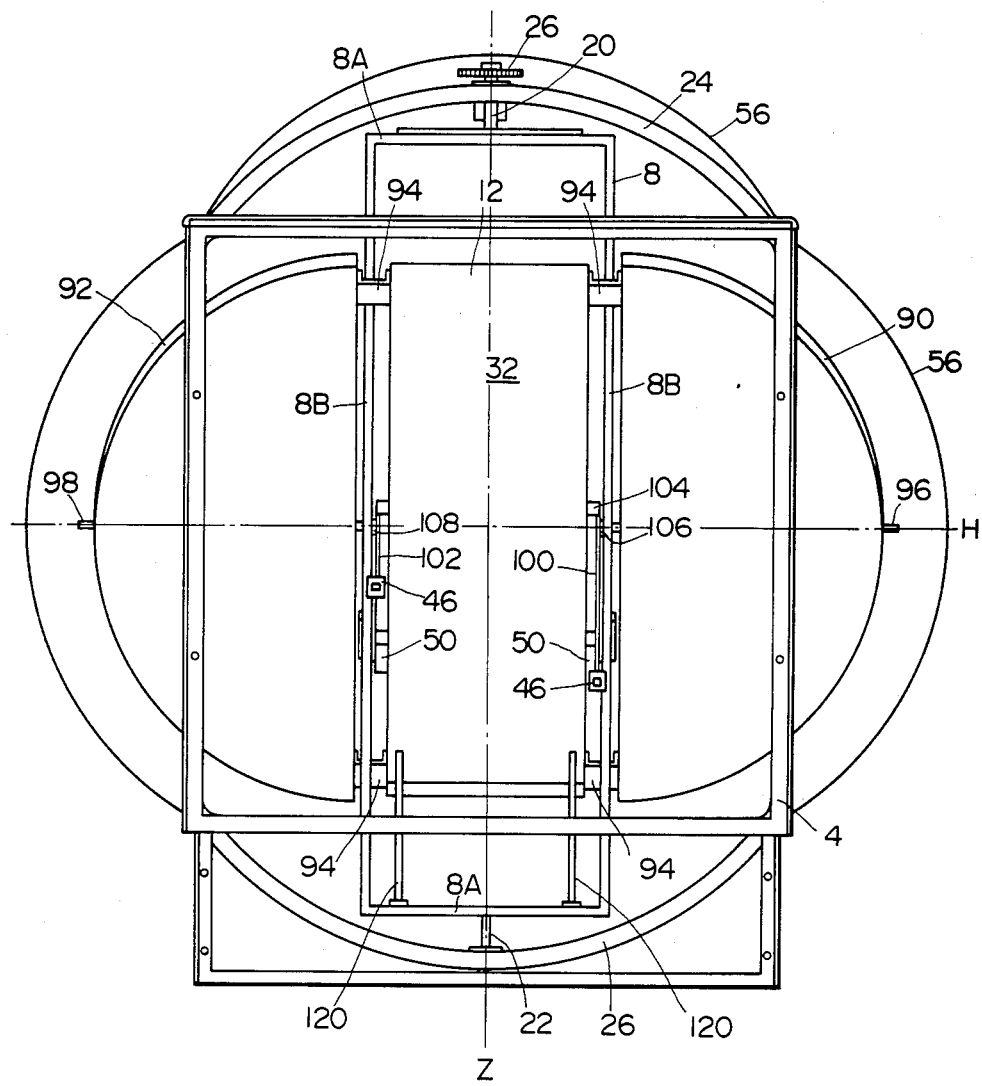
FIG. 11 is a front view of a modified embodiment of the light introducing unit of FIG. 2.
Figure 12:
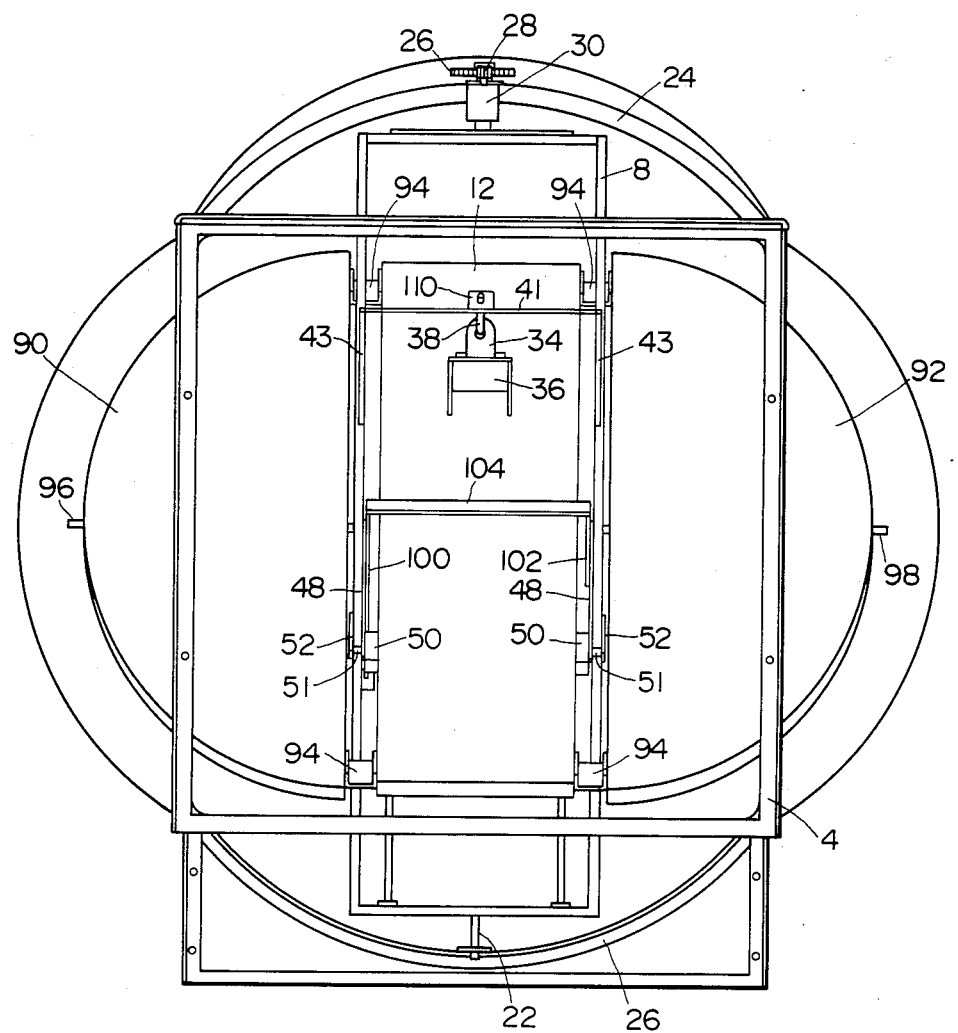
FIG. 12 is a rear view of the light introducing unit of FIG. 11.

FIGS. 11 and 12 illustrate a modified form of the light introducing unit 3, and in which this modification is generally distinct in that it has a pair of semicircular plane mirrors 90 and 92 joined through four channel shaped joints 94, 94, 94 and 94 to the opposite side edges of the mirror 32 to form an assembled plane mirror having a generally ellipse shape. The two semicircular mirrors 90 and 92 are connected to the side frame members 8B and 8B of the inner frame 8 respectively through shafts 96 and 98, which are horizontally fixed to corresponding side frame members 8B, for rotation about the horizontal axis H. In this modification, the mirror 12 is not directly connected to the side frame members 8B and 8B. Further, sun following levers 100 and 102, on each of which a fine control sensor 46 is mounted, are connected to the side frame members 8B and 8B through pins 106 and 108, respectively. The rear ends of the sun following levers 100 and 102 are joined with a horizontal connecting rod 104. The inner frame 8 is provided at its lower frame member 8A with a pair of introduced light sensors 120 and 120 of the same structure as the fine control sensors 46. The introduced light sensors 120 and 120 are mounted to the lower frame member 8A so that their body portions 178 are directed vertically upwardly. These introduced light sensors 120 and 120 are electrically connected to the control unit 55 for more precisely controlling the angles of the mirror about the vertical and horizontal axes Z and H. However, the introduced light sensors 120 and 120 may be omitted. Further, they may function as fine control sensors without providing the fine control sensors 46 and 46.

Figure 13:
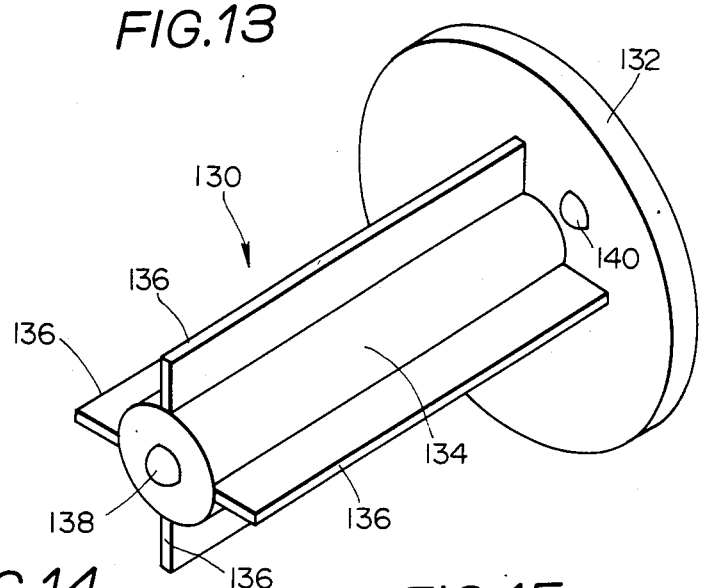
FIG. 13 is a perspective view of a modified embodiment of the fine control sensor of FIG. 7.
Figure 14:
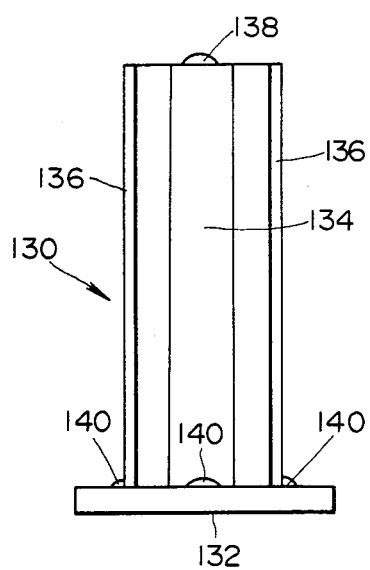
FIG. 14 is a side elevational view, with a reduced scale, of the fine control sensor of FIG. 13.
Figure 15:
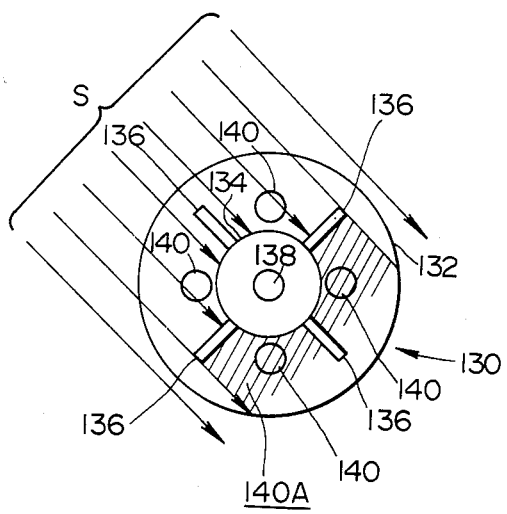
FIG. 15 is a front elevational view of the fine control sensor of FIG. 14.

A modified form of the fine control sensors 46 is illustrated in FIGS. 13 to 15, which includes a base disc 132 and a cylindrical body portion 134 which has four parallel rectangular fin plates 136 mounted to it at regular angular intervals of 90° about its center. Four photosensors 140, 140, 140 and 140 are mounted to the base disc 132 between adjacent fin plates 136 at regular angular intervals of 90° about the center of the body portion 134. The body portion 134 has another photosensor 138 mounted at its top although this sensor 138 may be omitted. Each groove defined by the body portion 134 and an adjacent two fin plates performs the same function as the semicircular groove 80 of the fine control sensors 46 in FIG. 7, as shown in FIG. 15.

The rotational axis of the inner frame 8 may be inclined to the vertical axis Z, in which case the horizontal axis H is perpendicular to the inclined rotation axis. In a specific embodiment, the outer frame 4 may be placed so that the rotational axis of the inner frame is horizontal.

While the invention has been disclosed in specific detail for purposes of clarity and complete disclosure, the appended claims are intended to include within their meaning all modifications and changes that come within the true scope of the invention.

What is claimed is:

1. A natural lighting apparatus comprising:
   a. a plane mirror having a plane mirror face for reflecting light therefrom in a front direction;
   b. a supporting means for supporting the mirror for rotation about both a first vertical axis parallel to said plane mirror and a second horizontal axis parallel to said plane mirror and perpendicular to the first vertical axis, said supporting means comprising an outer frame and an inner frame supported on the outer frame for rotation about the first vertical axis, said plane mirror being supported on the inner frame to be rotatable about the second horizontal axis;
   c. a first sensing means for sensing the direction of the light source relative to and about the first vertical axis, and for generating a first signal representative thereof, said first sensing means including a pair of first photosensors for receiving light from the light source to generate the first signal;
   d. a second sensing means for sensing the direction of the light source relative to and about the second horizontal axis, and for generating a second signal representative thereof, said second sensing means including a pair of second photosensors for receiving light from the light source to generate the second signal;
   e. an attitude control means for angularly moving the mirror about the first axis in accordance with the first signal from the first sensing means and about the second axis in accordance with the second signal from the second sensing means, thus controlling the attitude of the mirror to reflect light from the light source in a predetermined direction, said attitude control means comprising a light source following lever, mounted to said inner frame for pivotal movement about the second horizontal axis, and a slider link means, connecting the mirror to both the inner frame and the light source following lever, for controlling an angle defined between the mirror and the inner frame about the second horizontal axis to be one half of an angle defined between the inner frame and the light source following lever about the horizontal axis, to thereby reflect light from the light source in the predetermined direction, said first sensing means being mounted to the inner frame, and said second sensing means being mounted to the light source following lever, and wherein said attitude control means comprises a first rotation unit for rotating the inner frame about the first vertical axis, and a second rotation unit for rotating the mirror about the second horizontal axis, wherein the attitude control means further comprises a control unit for comparing the signals from the first photosensors to control the first rotation unit to rotate the inner frame so as to direct the mirror in the first light source direction and for comparing the signals from the second photosensors to control the second rotation unit to rotate the inner frame to direct the mirror in the second light source direction.

2. A natural lighting apparatus as recited in claim 1, wherein the light source is a sun, and further comprising light reflecting means for reflecting the light, reflected by the mirror in the predetermined direction, toward a predetermined position.

3. A natural lighting apparatus as recited in claim 1, wherein said first sensing means comprises, a base portion, and a tubular body portion having a regular cross-section, having a center axis and erected on the base portion, the base portion being attached to the inner frame so that the body portion extends in the front direction, and said pair of first photosensors being disposed on opposite positions about the center axis of the body portion, for receiving light from the light source to generate the first signal.

4. A natural lighting apparatus comprising:
 a. a mirror having a segmented mirror face for reflecting light therefrom in a front direction;
 b. a supporting means for supporting the mirror for rotation about both a first vertical axis parallel to said segmented mirror and a second horizontal axis parallel to said segmented mirror and perpendicular to the first vertical axis, said supporting means comprising an outer frame and an inner frame supported on the outer frame for rotation about the first vertical axis, said mirror being supported on the inner frame to be rotatable about the second horizontal axis;
 c. a first sensing means for sensing the direction of the light source relative to and about the first vertical axis, and for generating a first signal representative thereof, said first sensing means including a pair of first photosensors for receiving light from the light source to generate the first signal;
 d. a second sensing means for sensing the direction of the light source relative to and about the second horizontal axis, and for generating a second signal representative thereof, said second sensing means including a pair of second photosensors for receiving light from the light source to generate the second signal;
 e. an attitude control means for angularly moving the mirror about the first axis in accordance with the first signal from the first sensing means and about the second axis in accordance with the second signal from the second sensing means, thus controlling the attitude of the mirror to reflect light from the light source in a predetermined direction, said attitude control means comprising a light source following lever, mounted to said inner frame for pivotal movement about the second horizontal axis, and a slider link means, connecting the mirror to both the inner frame and the light source following lever, for controlling an angle defined between the mirror and the inner frame about the second horizontal axis to be one half of an angle defined between the inner frame and the light source following lever about the horizontal axis, to thereby reflect light from the light source in the predetermined direction, said first sensing means being mounted to the inner frame, and said second sensing means being mounted to the light source following lever, and wherein said attitude control means comprises a first rotation unit for rotating the inner frame about the first vertical axis, and a second rotation unit for rotating the mirror about the second horizontal axis, wherein the attitude control means further comprises a control unit for comparing the signals from the first photosensors to control the first rotation unit to rotate the inner frame so as to direct the mirror in the first light source direction and for comparing the signals from the second photosensors to control the second rotation unit to rotate the inner frame to direct the mirror in the second light source direction.

5. A natural lighting apparatus as recited in claim 4, wherein the light source is a sun, and further comprising light reflecting means for reflecting the light, reflected by the mirror in the predetermined direction, toward a predetermined position.

6. A natural lighting apparatus as recited in claim 4, wherein said segmented mirror comprises a rectangular central mirror segment and a pair of semicircular mirror segments joined to opposite sides of said rectangular central mirror to form an assembled plane mirror having a generally ellipse shape.

* * * * *